US 8,086,536 B2

(12) United States Patent
Dublish et al.

(10) Patent No.: US 8,086,536 B2
(45) Date of Patent: Dec. 27, 2011

(54) LOCATION BASED LICENSING

(75) Inventors: Pratul Dublish, Sammamish, WA (US);
Sean A. Emam, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1317 days.

(21) Appl. No.: 10/943,470

(22) Filed: Sep. 16, 2004

(65) Prior Publication Data
US 2006/0059096 A1 Mar. 16, 2006

(51) Int. Cl.
*G06F 21/00* (2006.01)
(52) U.S. Cl. ............... 705/57; 705/50; 705/51; 705/59; 380/201; 380/202; 380/203; 380/204
(58) Field of Classification Search ............. 705/57; 707/1, 10
See application file for complete search history.

(56) References Cited

U.S. PATENT DOCUMENTS

| | | | | |
|---|---|---|---|---|
| 6,226,618 B1 * | 5/2001 | Downs et al. | ...................... | 705/1 |
| 6,859,791 B1 * | 2/2005 | Spagna et al. | .................. | 705/51 |
| 6,968,996 B2 * | 11/2005 | Reddy et al. | .................. | 235/380 |
| 7,039,615 B1 * | 5/2006 | Gajjala et al. | .................. | 705/59 |
| 7,143,439 B2 * | 11/2006 | Cooper et al. | .................. | 726/11 |
| 7,165,174 B1 * | 1/2007 | Ginter et al. | .................. | 713/153 |
| 7,194,092 B1 * | 3/2007 | England et al. | ............... | 380/262 |
| 7,213,266 B1 * | 5/2007 | Maher et al. | ..................... | 726/26 |
| 7,255,270 B2 * | 8/2007 | Kwon et al. | .................. | 235/382 |
| 7,305,366 B2 * | 12/2007 | Chase et al. | ..................... | 705/59 |
| 2003/0023578 A1 * | 1/2003 | Durand et al. | .................... | 707/1 |

FOREIGN PATENT DOCUMENTS

| | | |
|---|---|---|
| CN | 1474966 | 2/2004 |
| EP | 1 037 447 A2 | 9/2000 |
| JP | HEI09-190236 | 7/1997 |
| JP | 2000-011538 | 1/2000 |
| JP | 2003-067326 | 3/2003 |
| JP | 2003-348078 | 5/2003 |
| JP | 2003-067326 * | 7/2003 |
| JP | 2004-240960 | 8/2004 |
| JP | 2005-510912 | 4/2005 |
| JP | 2005-530405 | 10/2005 |
| WO | WO 02/37246 A2 | 5/2002 |
| WO | WO 03/034192 A1 | 4/2003 |
| WO | WO03/045099 | 5/2003 |

(Continued)

OTHER PUBLICATIONS

Dorothy E. Denning and Peter F. MacDoran. Location-Based Authentication: Grounding Cyberspace for Better Security. Computer Fraud & Security, Feb. 1996, Elsevier science Ltd. Copyright 1996. Retrieved from IDS.*

(Continued)

*Primary Examiner* — James A Reagan
(74) *Attorney, Agent, or Firm* — Merchant & Gould

(57) ABSTRACT

The present invention provides a method and system for location-based digital rights management. Digital rights for protected content are restricted to a specific location or region by specifying the approved location of the consuming device within the license. This allows the content owner to specify the geographic locations/regions at which the protected content may be consumed. The device obtains its location from a location entity which is then evaluated against the location constraint within the license. If the device is within the location constraint then the content may be accessed. Acquiring the location of the device before allowing access to certain content helps in preventing a user from accessing a protected document in an area which is considered a prohibited location as defined within the license.

25 Claims, 5 Drawing Sheets

FOREIGN PATENT DOCUMENTS

WO    WO03/107625    12/2003

OTHER PUBLICATIONS

Dorothy E. Denning et al., "Location-Based Authentication: Grounding Cyberspace for Better Security", Computer Fraud & Security, Feb. 1996, pp. 1-6.

William Shapiro et al., "How to Manage Persistent State in DRM Systems", InterTrust Technology Corporation, Aug. 2001, pp. 1-11.

Ingo Elsen et al., "Streaming Technology in 3G Mobile Communication Systems", IEEE, Sep. 2001, pp. 46-52.

Radek Vingralek, "Supporting E-Commerce in Wireless Networks", InterTrust Technologies Corporation, Oct. 2001, 7 pgs.

Roberto Garcia et al., "Brokerage of Intellectual Property Rights in Semantic Web", Distributed Multimedia Applications Groups (DMAG), Technology Department, Universitat Pompeu Fabra, 16 pgs.

Roberto Garcia et al.; *Brokerage of Intellectual Property Rights in Semantic Web*"; 16 pgs.

Office Action issued Apr. 3, 2009, in CN Pat. Appl. No. 200510104173.9, w/translation.

Office Action issued Sep. 4, 2009, in CN Pat. Appl. No. 200510104173.9, w/translation.

Office Action issued Nov. 13, 2006, in EP Pat. Appl. No. 05108156.0.

Office Action issued May 24, 2011, in JP Pat. Appl. No. 2005-270450, w/Translation.

* cited by examiner

LOCATION BASED LICENSING

BACKGROUND OF THE INVENTION

Digital Rights Management aids in protecting and securely delivering content for use on a computer, portable device, or network device. Content owners lock their content with a key such that when a user acquires the locked content it can not be used without the user acquiring the key. To obtain the key, the user obtains a license from the licensing authority and stores the license on their device. Once the key is obtained, the content may be accessed on the users device according to the rule or rights that are specified in the license. Licenses include additional restrictions on rights including items such as: start times and dates, duration, and number of times a right can be exercised. For instance, the rights in a license may allow the consumer to access the content on a specific computer and copy the content to a portable device.

SUMMARY OF THE INVENTION

The present invention is directed at providing a method and system for providing location-based digital rights management.

According to one aspect of the invention, digital rights for protected content are restricted to a specific location or region by specifying the approved location of the consuming device within the license. This allows the content owner to specify the geographic locations/regions at which the protected content may be consumed.

According to another aspect of the invention, the device obtains its location from a location entity which is then evaluated against the location constraint within the license. If the device is within the location constraint then the content may be accessed. Acquiring the location of the device before allowing access to certain content helps in preventing a user from accessing a protected document in an area which is considered a prohibited location as defined within the license. For instance, the location constraint may be set such that a user can not access a sensitive company-confidential document in the vicinity of a competitor's office.

DETAILED DESCRIPTION OF THE PREFERRED EMBODIMENT

Generally, the present invention is directed at providing a method and system for providing location-based digital rights management.

Illustrative System

Figure 2:
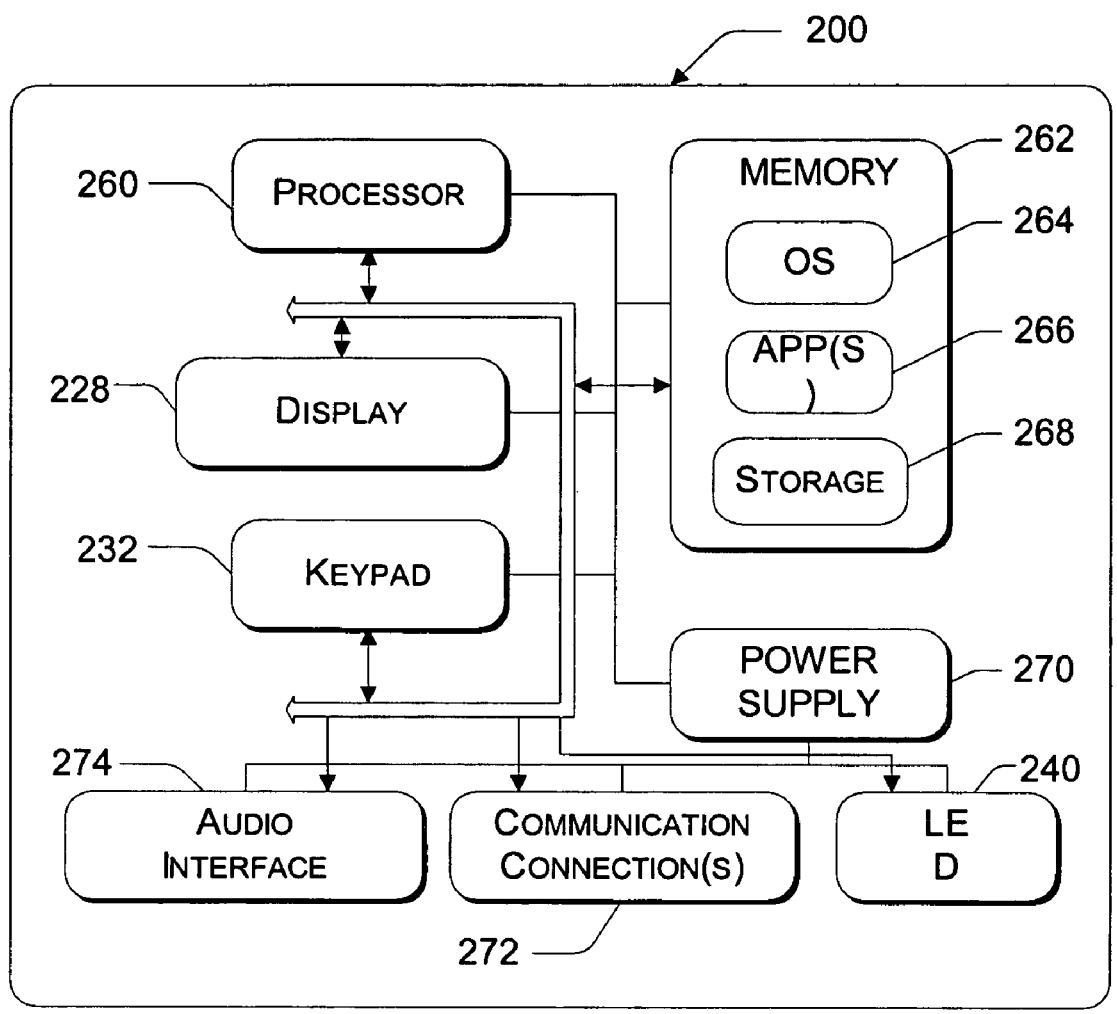
Figure 3:
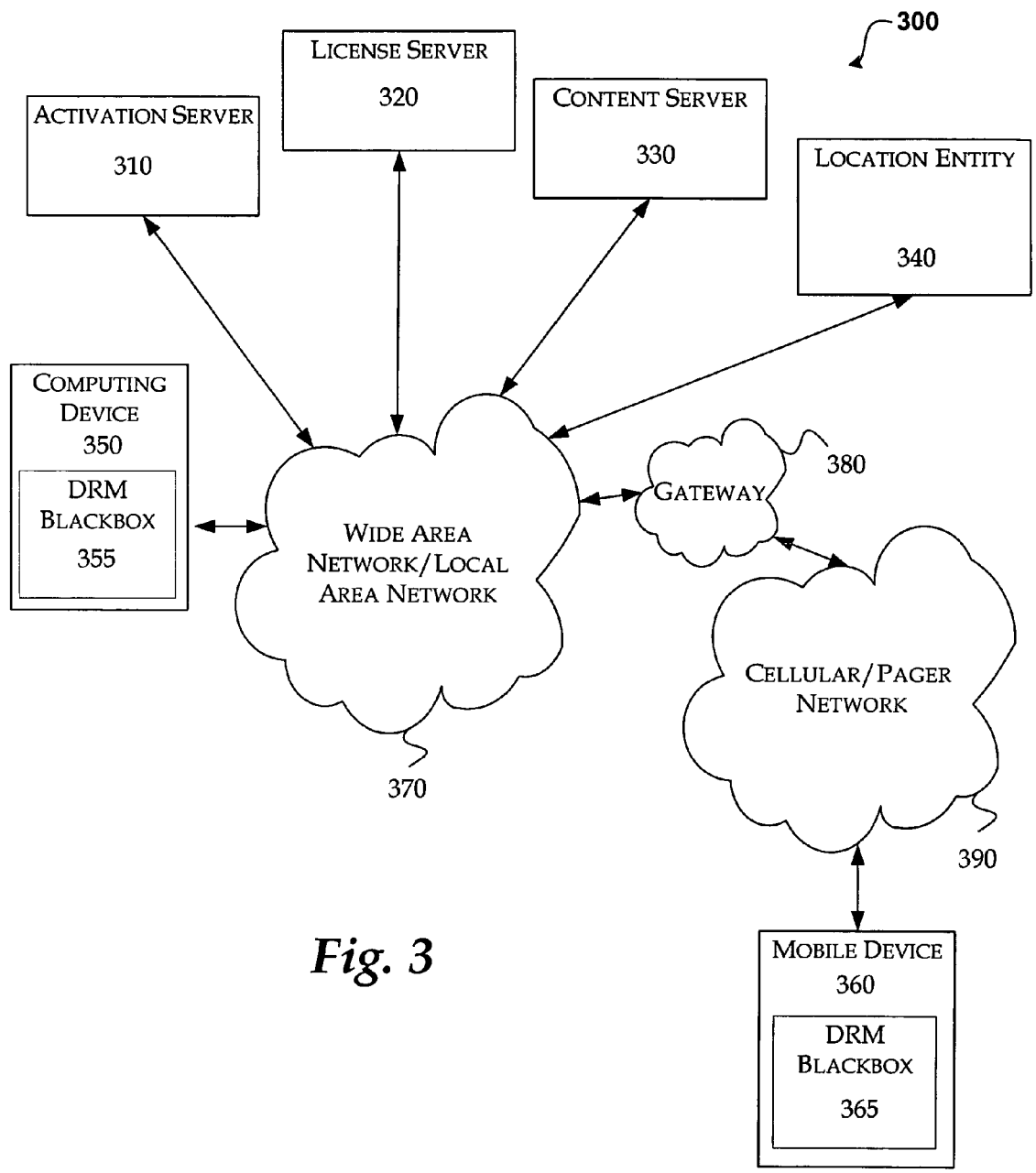
FIG. 3 is a functional block diagram generally illustrating a location based digital rights management system.

FIG. 3 is a functional block diagram generally illustrating a location based digital rights management system, in accordance with aspects of the invention. Activation server 310, license server 320, content server 330, location server 340, and computing device 350 are computing devices such as the one described in conjunction with FIG. 1. Mobile device 360 is a mobile computing device such as the one described in conjunction with FIG. 2.

As illustrated, a user may attempt to access protected content obtained from content server 330 on computing device 350 and mobile device 360. Generally, DRM (Digital Rights Management) blackbox 355 residing on computing device 350 and DRM blackbox 365 residing on mobile computing device 360 are configured to restrict access to content based on a location constraint. The DRM blackboxes are configured to enforce the DRM licenses issued by license server 320. The DRM licenses may include location constraints relating to one or more rights associated with the content. According to one embodiment, the digital rights for content are restricted to a specific location or region by specifying the approved location of the consuming device within the license. This allows the content owner to specify the geographic locations/regions at which the protected content may be consumed. The location constraints may be expressed in a variety of ways. For example, location constraints can be expressed using arbitrary polygons, postal codes, geographic entity names (city, metro areas, county, state, country, territory, etc.), and the like.

The blackbox is configured to perform many different operations including examining the license associated with the content and examining the location constraints within the license. Blackbox 355 and 365 maintain a secure connection with location entity 340.

When a user attempts to exercise a location-constrained right for the protected content, the DRM blackbox on the user's device (355, 365) sends a request to the trusted location entity (340) to verify if the device satisfies the location-constraint for the right that has been requested. According to one embodiment, the request contains the DRM blackbox's public-key certificate and is signed with the DRM blackbox's private key. This public-key/private-key information allows location entity 340 to verify that the request is being made by a trusted DRM blackbox.

According to one embodiment of the invention, the device may periodically check with location entity 340 to determine if the device has moved out of or into the approved geographic area as specified in the location constraint. Acquiring the location of the device helps in preventing a user from accessing a protected document in an area which is considered a prohibited location as defined within the license. For instance, the location constraint may be set such that a user can access a company document while the device is within one of its campuses but not be able to access the document when the device is outside of its campuses.

DRM blackboxes 355 and 365 are also configured to communicate with the servers regarding activating, licensing, obtaining content, and determining the device's location. Blackboxes 355 and 365 may communicate using any one of several client-server protocols.

If trusted location entity 340 determines that the location constraint is satisfied, the DRM blackbox allows the right to the content to be exercised on the device. Otherwise, it blocks the user from exercising the right.

Cellular/pager network 390 is a network responsible for delivering messages to and receiving messages from wireless devices. Cellular/pager network 390 may include both wireless and wired components. For example, cellular/pager network 390 may include a cellular tower that is linked to a wired telephone network. Typically, the cellular tower carries communication to and from cell phones, long-distance communication links, and the like.

Gateway 380 routes messages between cellular/pager network 390 and WAN/LAN 370. For example, a computer user may send a message that is addressed to a cellular phone. Gateway 380 provides a means for transporting the message from the WAN/LAN 370 to cellular/pager network 390. Conversely, a user with a device connected to a cellular network may be browsing the Web. Gateway 380 allows hyperlink text protocol (HTTP) messages to be transferred between WAN/LAN 370 and cellular/pager network 390.

Activation server 310 is configured to provide devices with unique black boxes and machine/user certificates which provide each device with a unique identity.

License server 320 is configured to store and provide the licenses and their associated rights to devices that are authenticated to receive the license. The content owner specifies the location constraints in the DRM license for the protected content.

Content server 330 is configured to store and provide content that may be location-constrained to the devices. The content may include the information necessary for the device to obtain a license from license server 320 to access the content.

A DRM blackbox is installed on a device, such as computing device 350 or mobile device 360, before any protected content can be accessed on the device. The existing techniques for creating a unique blackbox based on the hardware characteristics of a PC can be used for mobile devices. Mobile devices, such as mobile phones, however, differ from PCs and other computing devices in that they have a unique hardware identifier and mobile operators use this unique identifier to authenticate phones on their network. For example, the IMSI (International Mobile Subscriber Identity) number serves as the unique identifier for GSM phones on an operator's network. The ESN (Electronic Serial Number) serves as the unique identifier for CDMA phones. The ESN number is a unique number that is hardwired into the phone at manufacturing time. The IMSI number is contained in the SIM (Subscriber Identity Module). The SIM is a cryptographically secure smartcard without which a GSM phone is not allowed on a mobile network. This unique number may be used in creating DRM blackbox 365 and storing this unique number in the machine certificate of the blackbox. Each time DRM blackbox 365 is called it verifies that the unique identifier in its machine certificate matches the unique identifier for the mobile device. If this check fails, DRM blackbox 365 refuses to grant any rights. Once the blackbox is installed, the device is ready to consume protected content.

Location entity 340 is configured to provide location information to the devices. According to one embodiment, location server 340 communicates with the mobile operator using secure links over which requests for location can be sent and responses received. According to one embodiment, location entity 340 evaluates location constraints. According to one embodiment, an external service, such as Microsoft's MapPoint service may be used by location entity 340 to determine whether a coordinate satisfies a location constraint. Many methods may be used to evaluate the location constraint as long as the evaluations are secure against tampering and spoofing.

According to one embodiment, location entity server 340 may communicate with a mobile carrier to determine where a mobile device is located. Most mobile-phone networks know the approximate location of the mobile devices on their network. The mobile network knows the cell-tower which is currently handling the device and can provide the latitude and longitude for the cell tower. Further, mobile networks in USA are implementing more accurate location technologies such as Assisted GPS (A-GPS), Time Difference of Arrival (TDOA), Enhanced Observed Time Difference (EOTD) etc., to comply with FCC's E-911 mandate. These technologies typically allow a mobile device's location to be quickly determined with a high-degree of accuracy (100-300 m accuracy within 5-10 seconds). Furthermore, with the exception of A-GPS, these technologies do not require any modifications to the existing mobile phones.

Interaction Between DRM Blackbox and Location Entity

Figure 4:
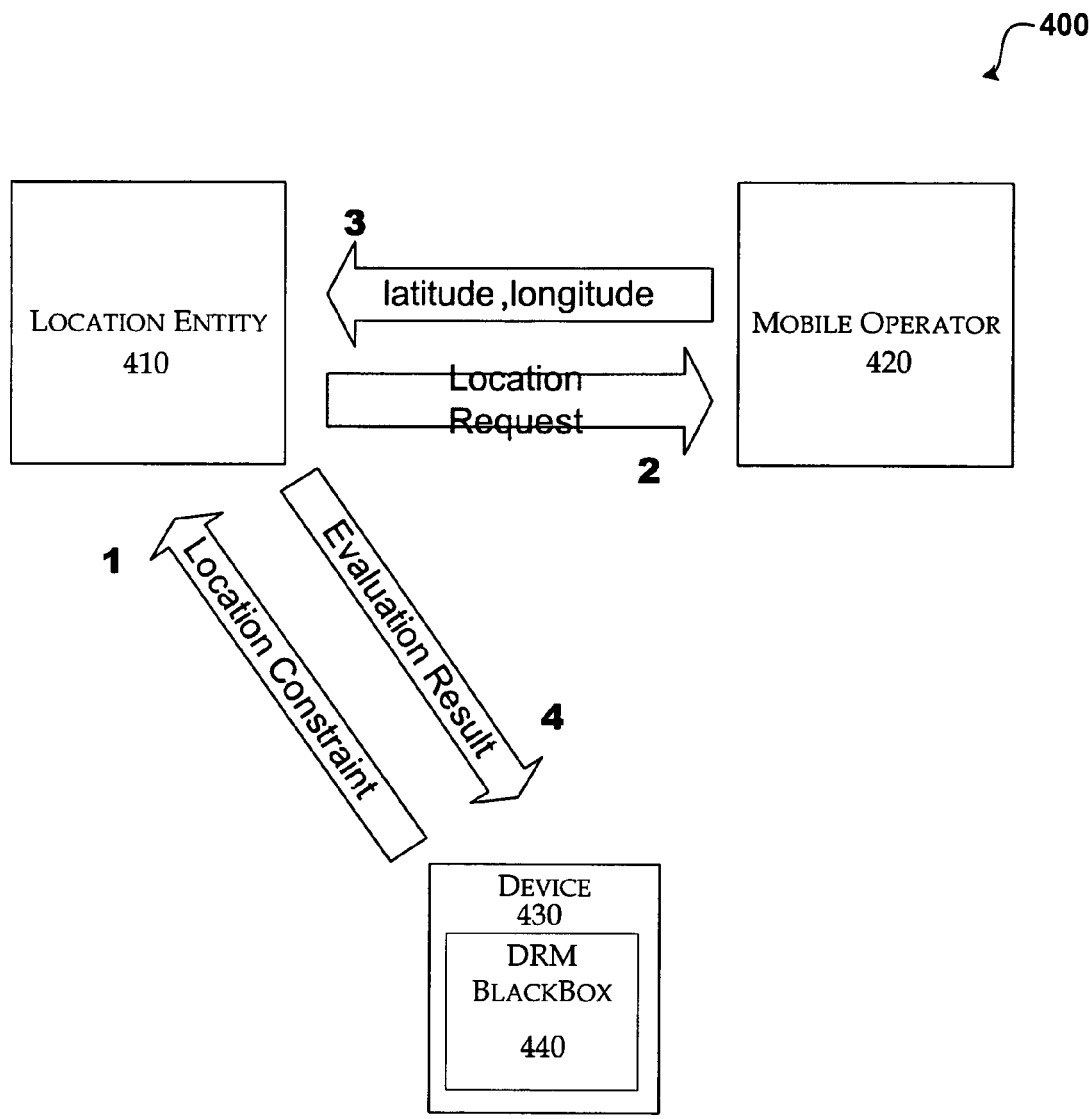
FIG. 4 illustrates the interaction between the DRM blackbox on a mobile device and network-based location entity.

FIG. 4 illustrates the interaction between the DRM blackbox on a mobile device and network-based location entity, in accordance with aspects of the invention.

When the user attempts to access content that is restricted by a location constraint, DRM blackbox 440 receives a request for a location-constrained right. For example, a media player may ask to play a media file that is location-constrained. Upon receiving the request, DRM blackbox 440 creates a location request for location entity 410. According to one embodiment, the location request contains: the location-constraint for the requested right as specified in the DRM license for the protected content; the device's unique identifier (IMSI/ESN number) contained in the blackbox's machine certificate; and a random number to aid in preventing capture and replay attacks. The blackbox signs the request with its private key.

Blackbox 440 then obtains the address of network-based location entity 410. This address may be present in the DRM license, in a DRM-specific configuration file, provided by the user, or stored elsewhere on device 440. Once the address of location entity 410 is obtained, blackbox 440 sends the location constrain request to network-based location entity 410 over a secure channel.

According to one embodiment, location entity 410 uses the IMSI/ESN numbers to determine the mobile operator for the requesting device. When the location constraint specifies a list of mobile operators, entity 410 verifies that the mobile operator is allowed by the location constraint. Entity 410 then sends a location request that includes the unique identifier of the device to mobile operator 420 asking for the current location of the requesting device.

Mobile operator 420 determines the latitude and longitude for the device bearing the unique identifier and sends it back to location entity 410. If mobile operator 420 can't locate the device, an error is returned to location entity 410.

If entity 410 receives an error from mobile operator 420, entity 410 returns an error to DRM blackbox 440, and the blackbox does not grant the requested right.

If entity 410 receives a latitude and longitude from mobile operator 420, it uses this location information to evaluate the location constraint. According to another embodiment, the evaluation of the constraint may be performed at another location. For example, the evaluation may be performed on device 430, mobile operator 420, or some other trusted device. Once the evaluation is complete, entity 410 attaches the result of the evaluation, which is TRUE/FALSE according to one embodiment, to the original location request sent by blackbox 440, and signs the resulting message with its private key. It also attaches its own public-key certificate to the signed message, and sends it to blackbox 440. In order to help ensure integrity of the keys, the entity's public key is certified by a root that is trusted by the DRM blackbox.

Upon receiving the response, DRM blackbox 440 verifies that the evaluation result response contains its original request and that the response is signed by a trusted entity. According to one embodiment, DRM blackbox verifies the entity's signature on the response and verifies the entity's public-key certificate.

If the verifications are successful and the entity has evaluated the constraint to be TRUE, then the blackbox allows the requested right and decrypts the protected content. Otherwise, the requested right is denied.

The DRM blackbox can use a variety of techniques such as code obfuscation, tamper-proof code segments, using machine code, and the like to prevent a malicious user from "feeding" it a unique identifier that is different from the actual unique identifier of the mobile phone However, if a user can somehow change the unique identifier on his device, then it is possible to break the security. Suppose that the user has two phones: A and B. He somehow changes the unique identifier of B so that it is the same as A. He now installs a DRM blackbox on B, and downloads protected content and licenses on B. The user leaves A in an "allowed" location and travels to a "prohibited" location with B. He switches off the radio stack on B, tethers it to a PC, and uses the PC's Internet connection to send a request to the location entity. Note that this request has A's unique identifier. Since only A is on the operator's network, the operator will return A's location, and the user will be able to access protected content on B in a "prohibited" location. This type of attack can be blocked by having the DRM blackbox check if the radio stack has been turned off or the phone is tethered. If either of these is true, the blackbox refuses all location-constrained rights.

Accessing Location-Constrained Content While Moving

Figure 5:
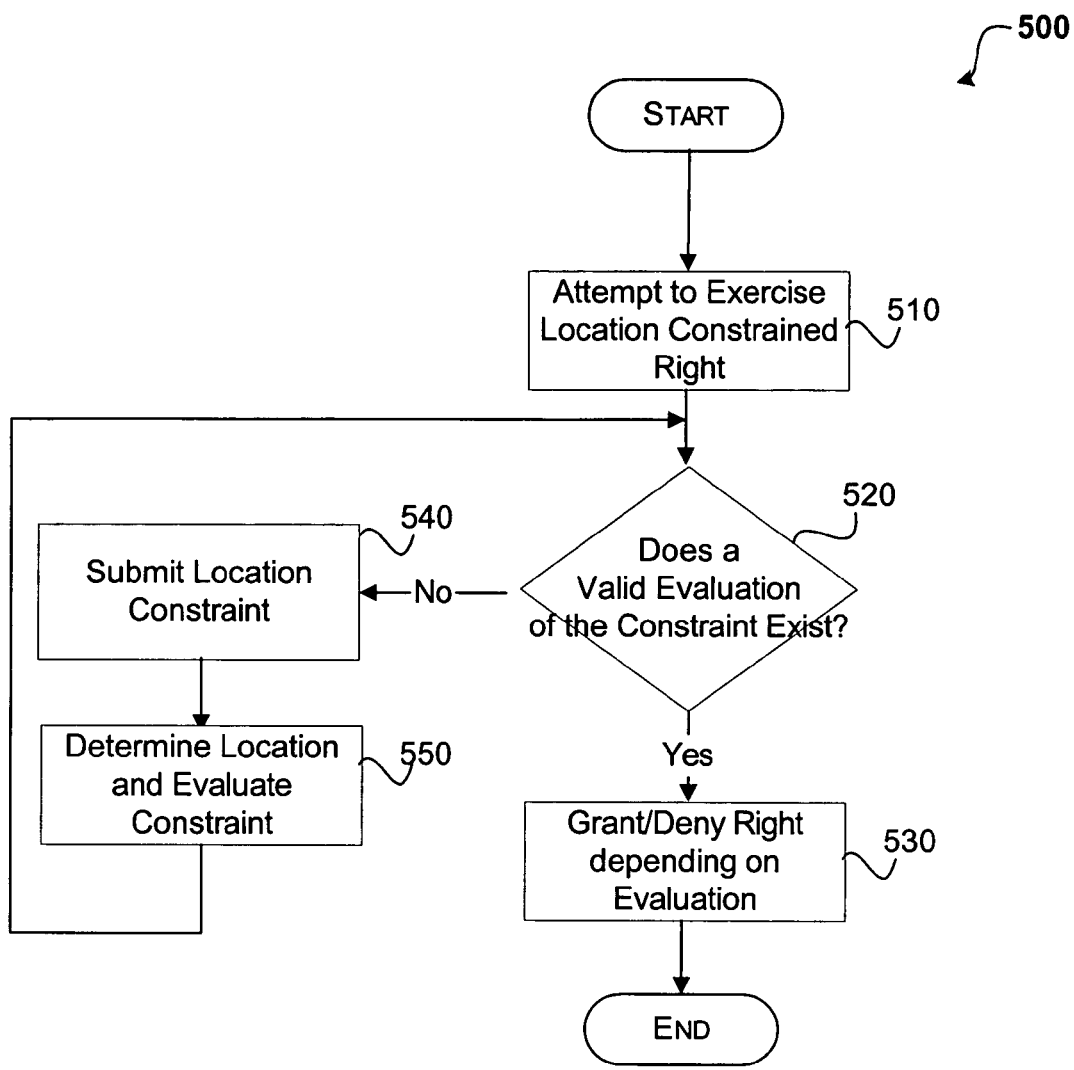
FIG. 5 shows a process for accessing location-constrained content while a device is moving, in accordance with aspects of the invention.

FIG. 5 shows a process for accessing location-constrained content while a device is moving, in accordance with aspects of the present invention. After a start block, the process moves to block 510 where an application attempts to exercise a location constrained right. Moving to decision block 520, a determination is made as to whether a valid evaluation of the constraint exists. According to one embodiment, a blackbox makes this determination. When a valid evaluation of the constraint exists, the process moves to block 530 where the right is granted or denied depending on the results of the evaluation. The process then moves to an end block.

When a valid evaluation does not exist, the process flows to block 540 where the location constraint is submitted to a location entity. Moving to block 550, the location of the device is determined and the constraint is evaluated. The process then returns to decision block 520.

According to one embodiment, the evaluation of the constraint may only be valid for a period of time. When the period has expired, the location constraint is resubmitted for evaluation. The time period can be set many different ways. For example, the time period may be specified in the location constraint or randomly selected by the blackbox. The blackbox can deny the right (i.e. stop decrypting any more content) if location entity returns FALSE or failure.

A "valid until" or "time period of validity" value may also be added to the response sent to the blackbox. The blackbox can then grant the right to the content within the validity period and resubmit the location constraint at the end of the validity period. The location entity can also determine the desired time period by sending at least two location requests to the mobile operator within a short period of time to estimate the mobile device's speed and direction of travel. Generally, the larger the distance to a location constraint, the larger the time period may be set.

Exemplary Location Constraints

According to one embodiment of the invention, constraints are specified in an XML notation. Other ways of specifying the location constraints may be used. Several sample constraints are provided in this section but no attempt is made to be exhaustive. Our solution does not require the use of any specific language/notation for specifying location constraints. Any formal language that can be evaluated by a computer without any ambiguity will work for expressing location constraints. Some examples include: XML; XrML; Boolean expressions; First-order predicate calculus; Scripting languages such as VBScript, JavaScript, etc.; Programming Languages such as Visual Basic, C#, Java, C++, etc.

The following exemplary constraint allows the PLAY right to be exercised within a radius of 1000 meters around latitude=30N and longitude=50 W or within the area covered by zip code=98075.

```
<RIGHT> PLAY </RIGHT>
<LOCATION>
    <ALLOW>
        <CIRCLE>
            <LATITUDE> 30N </LATITUDE>
            <LONGITUDE> 50W </LONGITUDE>
            <RADIUS> 1000 </RADIUS>
        </CIRCLE>
            <ZIPCODE> 98075 </ZIPCODE>
    </ALLOW>
</LOCATION>
```

The following constraint blocks the PLAY right in King County, Wash.

```
<RIGHT> PLAY </RIGHT>
<LOCATION>
    <BLOCK>
        <COUNTY> KING </COUNTY>
        <STATE> WA </STATE>
        <COUNTRY> USA </COUNTRY>
    </BLOCK>
</LOCATION>
```

The following constraint only allows location data from OPERATOR1 and OPERATOR2 mobile operators (the content owner only trusts these operators to provide accurate location), and allows the PLAY right in areas covered by zip codes 98075 and 98052.

```
<RIGHT> PLAY </RIGHT>
<LOCATION>
    <ALLOW>
        <ZIPCODE> 98075 </ZIPCODE>
        <ZIPCODE> 98052 </ZIPCODE>
    </ALLOW>
    <MOBILEOPERATORLIST>
        <ALLOW>
            <OPERATOR>OPERATOR1</OPERATOR>
            <OPERATOR> OPERATOR2</OPERATOR>
        <ALLOW>
    </MOBILEOPERATORLIST>
</LOCATION>
```

The following constraint only does not allow location data from FLYBYNIGHT mobile operators (the content owner does not trust this operators to provide accurate location).

```
<RIGHT> PLAY </RIGHT>
<LOCATION>
    <ALLOW>
        <ZIPCODE> 98075 </ZIPCODE>
        <ZIPCODE> 98052 </ZIPCODE>
    </ALLOW>
```

```
<MOBILEOPERATORLIST>
    <BLOCK>
        <OPERATOR>FLYBYNIGHT</OPERATOR>
    </BLOCK>
</MOBILEOPERATORLIST>
</LOCATION>
```

Illustrative Operating Environment

Figure 1:
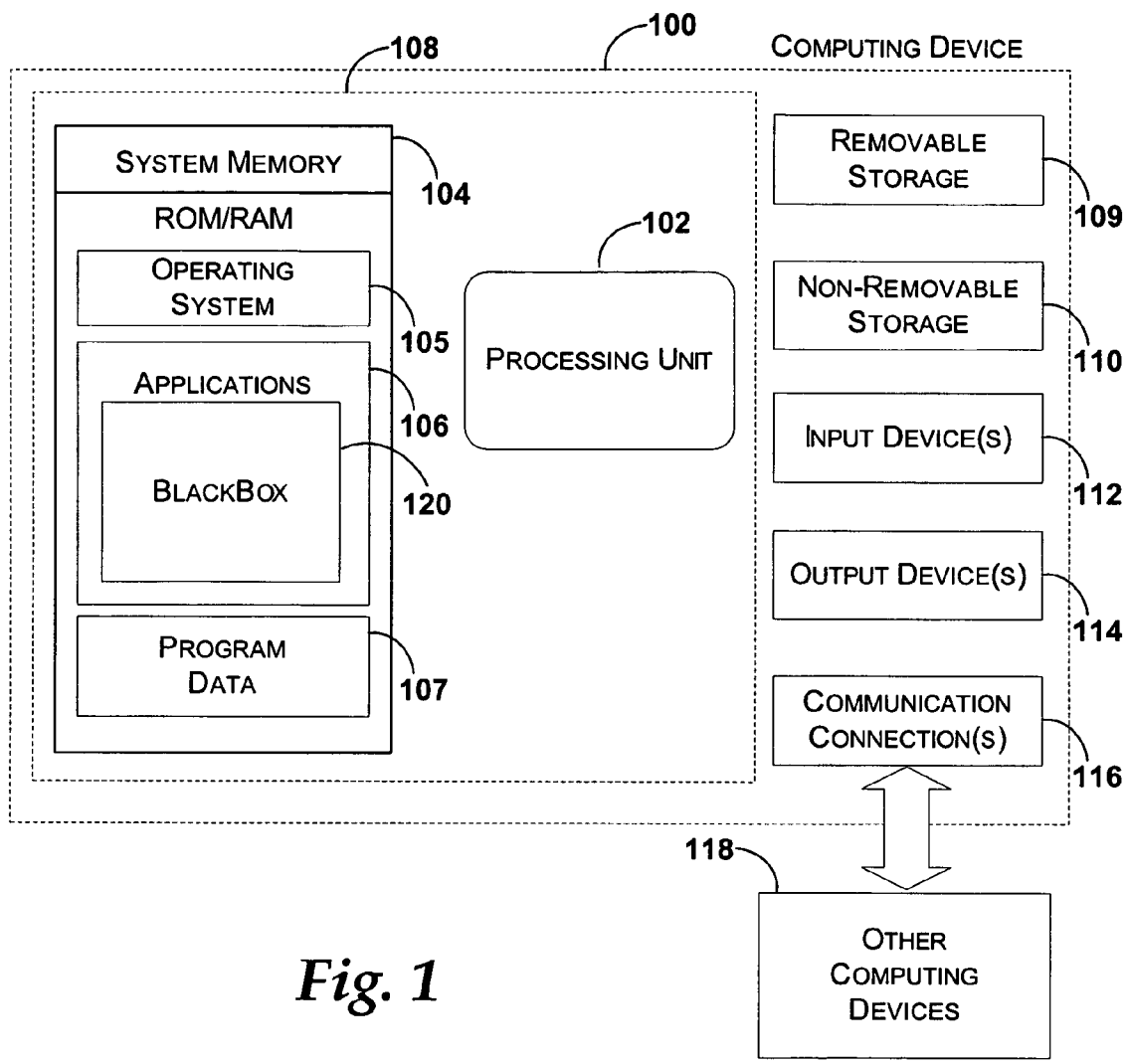
FIGS. 1 and 2 illustrate an exemplary computing devices that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include blackbox 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

FIG. 2 illustrates a mobile computing device that may be used in one exemplary embodiment of the present invention. With reference to FIG. 2, one exemplary system for implementing the invention includes a mobile computing device, such as mobile computing device 200. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on the operating system 264. A blackbox resides on mobile computing device 200 and is programmed to perform instructions relating to enforcing location constraints associated with DRM licenses. Mobile computing device 200 also includes non-volatile storage 268 within memory 262. Non-volatile storage 268 may be used to store persistent information which should not be lost if mobile computing device 200 is powered down.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes communications connection(s), such as a wireless interface layer, that performs the function of transmitting and receiving communications. Communications connection 272 facilitates wireless connectivity between the mobile computing device 200 and the outside world. According to one embodiment, transmissions to and from communications connection 272 are conducted under control of the operating system 264.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing location based digital rights management for content accessed on a device, comprising:
   determining if a location constraint exists for a requested right made by the device; wherein the location constraint specifies a specific geographic area at which the content is consumable and the location constraint further specifies a right associated with the content;
   determining a trusted location determining entity;

during a period of time the content is attempted to be consumed on the device, performing actions, comprising:

periodically acquiring geographic locations of the device as the device moves while the content is attempted to be consumed during the period of time from the trusted location entity to determine when the location of the device is within the specific geographic area and to determine when the location of the device is outside of the specific geographic area; wherein each of the geographic locations is based on a current physical location of the device;

evaluating the location of the device against the location constraint, wherein the evaluation compares geographic coordinates of the device with the specific geographic area defined by the location constraint; and on the device, denying the right specified by the location constraint when the location of the device is outside of the geographic area and on the device granting the right specified by the location constraint to the content when the location of the device is inside of the geographic area.

2. The method of claim 1, wherein acquiring the location of the device from the trusted location entity further comprises using a secure connection between the device and the trusted location entity.

3. The method of claim 1, wherein evaluating the location of the device against the location constraint is performed remotely from the device.

4. The method of claim 1, wherein evaluating the location of the device against the location constraint is performed locally on the device.

5. The method of claim 1, further comprising acquiring the location of the device and evaluating the location of the device against the location constraint when the device is moving.

6. The method of claim 1, wherein the location constraint is expressed using at least one of: a geometric description, postal codes and geographic entity names.

7. The method of claim 1, wherein acquiring the location of the device comprises determining at least one of: a latitude and longitude of the device; a spherical coordinate of the device; and a geographic entity name in which the device is located.

8. A system for providing location based digital rights management for content, comprising:

a device including:

a blackbox operative to perform actions, including:

determining if a location constraint exists for a requested right associated with the content; wherein the location constraint specifies a specific geographic area at which the content is consumable and the location constraint is represented by extensible markup language (XML), wherein the location constraint includes:

a rights section associated with the content, the rights section specifying the requested right associated with the content, an allow section specifying coordinates related to the specific geographic area in which the content is consumable;

during a period of time the content is attempted to be consumed on the device periodically sending requests for evaluation of the location constraint against a geographic location of the device to a trusted location entity such that a determination is periodically made as to whether the device is within the geographic area and when the device is outside of the specific geographic area specified by the allow section of the location constraint; and receiving an evaluation response and on the device granting or denying the requested right to the content based on the evaluation response; wherein the content is blocked when the geographic location of the device is outside of the specific geographic area and the content is accessible when the geographic location of the device is inside of the specific geographic area;

and wherein the location entity is operative to perform actions, including:

receiving the request for evaluation of the location constraint against the location of the device;

requesting the geographic location of the device;

receiving geographic coordinates of the device;

evaluating the specific geographic area defined by the allow section of the location constraint against the geographic coordinates of the device to generate an evaluation response; and transmitting the evaluation response to the blackbox.

9. The system of claim 8, wherein the location entity is further configured to evaluate the location of the device against the location constraint to determine whether the content may be accessed by the device.

10. The system of claim 8, wherein the location entity is further configured to communicate securely with the device.

11. The system of claim 8, wherein the location constraint specifies trusted mobile networks.

12. The system of claim 8, wherein the location entity is a trusted mobile network.

13. The system of claim 8, wherein the device further comprises a radio stack, and wherein the blackbox is further configured to refuse any location constrained rights when at least one of the following conditions occurs: when the radio stack has been turned off and when the device is tethered.

14. The system of claim 8, wherein granting or denying the requested right to the content based on the evaluation of the location of the device against the location constraint further comprises determining whether the device is located within any one of the following: a zip code, a county, a state, a circle defined by a geographical origin and a radius, or a country.

15. The system of claim 8, wherein the device is further configured to send the request for the location when the device is moving.

16. The system of claim 15, wherein the location constraint specifies a frequency of location requests.

17. The system of claim 15, wherein the location entity is further configured to specify a frequency of location requests.

18. The system of claim 17, wherein the device further includes a IMSI/ESN identifier that is used to uniquely identify the device.

19. The system of claim 8, wherein the location constraint is expressed using at least one of: a geometric description, postal codes and geographic entity names.

20. A computer-readable medium having computer-executable instructions for providing location based digital rights management for content accessed on a device, comprising:

determining if a location constraint exists for a requested right associated with the content; wherein the location constraint specifies a specific geographic area at which the requested right is consumable and the location constraint further specifies the requested right relates to access of content;

acquiring geographic locations of the device from a trusted location entity while the device is attempting to consume the content; wherein the geographic location of the device relates to geographical coordinates of the device; and on the device blocking or allowing access to the content based on an evaluation of the location of the device against the location constraint; wherein the evaluation comprises determining when the geographic location of the device is outside of the specific geographic area specified by the location constraint and when the geographic location of the device is inside of the specific geographic area specified by the location constraint.

21. The computer-readable medium of claim 20, wherein acquiring the location of the device from the trusted location entity further comprises using a secure connection between the device and the trusted location entity.

22. The computer-readable medium of claim 20, further comprising acquiring the location of the device and evaluating the location of the device against the location constraint when the device is moving.

23. The computer-readable medium of claim 20, wherein the location constraint is expressed using at least one of: geometric description, postal codes and geographic entity names.

24. The computer-readable medium of claim 20, wherein the location constraint is expressed using at least one of the following languages: XML; XrML; Boolean expressions; first-order predicate calculus; scripting languages; and a formal programming language.

25. The computer-readable medium of claim 20, wherein acquiring the location of the device comprises determining at least one of: a latitude and longitude of the device; a spherical coordinate of the device; and a geographic entity name in which the device is located.

* * * * *